United States Patent
Hwang et al.

(10) Patent No.: US 11,833,871 B2
(45) Date of Patent: Dec. 5, 2023

(54) MOBILITY VEHICLE HUB

(71) Applicants: Hyundai Motor Company, Seoul (KR); Kia Corporation, Seoul (KR)

(72) Inventors: Jin Ho Hwang, Cheonan-si (KR); Dong Eun Cha, Hwaseong-si (KR); Sang Heon Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 151 days.

(21) Appl. No.: 17/698,183

(22) Filed: Mar. 18, 2022

(65) Prior Publication Data
US 2023/0001756 A1    Jan. 5, 2023

(30) Foreign Application Priority Data
Jul. 1, 2021  (KR) .......................... 10-2021-0086657

(51) Int. Cl.
| | |
|---|---|
| *B60F 5/02* | (2006.01) |
| *B62D 63/02* | (2006.01) |
| *B60F 5/00* | (2006.01) |
| *E04H 6/44* | (2006.01) |
| *B64C 37/00* | (2006.01) |
| *E04H 6/22* | (2006.01) |

(52) U.S. Cl.
CPC ................ *B60F 5/02* (2013.01); *B60F 5/003* (2013.01); *B62D 63/025* (2013.01); *B64C 37/00* (2013.01); *E04H 6/22* (2013.01); *E04H 6/44* (2013.01)

(58) Field of Classification Search
CPC .......... B60F 5/02; B60F 5/003; B62D 63/025; B64C 37/00; E04H 6/22; E04H 6/44; B63B 35/44; B63B 35/50
See application file for complete search history.

(56) References Cited

U.S. PATENT DOCUMENTS

| | | | |
|---|---|---|---|
| 6,196,151 B1 * | 3/2001 | Grant ...................... | B63B 35/50 |
| | | | 114/261 |
| 6,341,573 B1 * | 1/2002 | Buck ....................... | B63B 35/50 |
| | | | 114/261 |

(Continued)

FOREIGN PATENT DOCUMENTS

| | | |
|---|---|---|
| JP | 2018526270 A | 9/2018 |
| KR | 1020050110171 A | 11/2005 |
| KR | 102231574 B1 | 3/2021 |

*Primary Examiner* — Valentina Xavier
(74) *Attorney, Agent, or Firm* — MORGAN, LEWIS & BOCKIUS LLP

(57) ABSTRACT

A mobility vehicle hub configured to function as a terminal for an air mobility vehicle, a ground mobility vehicle, or a water mobility vehicle, includes a plurality of layers through a combination of: a water layer connected to the surface of water and having an entrance for a water mobility vehicle; a port layer having a take-off and landing pad for an air mobility vehicle; or a ground layer configured to be connected to a ground and having an entrance for a ground mobility vehicle, wherein an elevation passage is provided between the layers, the elevation passage has an internal space extending in an up-down direction of the mobility vehicle hub, the internal space is connected to each of the water, port and ground layers, and the air mobility vehicle, the ground mobility vehicle, or the water mobility vehicle is lifted or lowered through the internal space.

19 Claims, 4 Drawing Sheets

(56) References Cited

U.S. PATENT DOCUMENTS

| | | | | |
|---|---|---|---|---|
| 6,912,965 | B2 * | 7/2005 | Leitch | B63B 1/125 |
| | | | | 114/61.12 |
| 9,457,900 | B1 * | 10/2016 | Jones | B64C 39/024 |
| 2003/0033967 | A1 * | 2/2003 | Hayman, III | B63B 1/14 |
| | | | | 114/61.15 |
| 2017/0197714 | A1 * | 7/2017 | Golden | B64C 39/024 |
| 2019/0144090 | A1 | 5/2019 | Schmidt et al. | |

\* cited by examiner

MOBILITY VEHICLE HUB

CROSS-REFERENCE TO RELATED APPLICATION

The present application claims priority to Korean Patent Application No. 10-2021-0086657, filed on Jul. 1, 2021, the entire contents of which is incorporated herein for all purposes by this reference.

BACKGROUND OF THE INVENTION

Field of the Invention

The present invention relates to a mobility vehicle hub provided on a water surface of a river, sea, or the like, and more particularly, to a mobility vehicle hub including a water layer configured on a water surface such that water mobility vehicles can move in/out, a ground layer connected to the ground above the water layer such that ground mobility vehicles can move in/out, and a port layer configured above the ground layer and provided with a take-off/landing pad for air mobility vehicles, configured as a complex mobility vehicle transfer base for ground/water/air mobility vehicles.

Description of Related Art

Conventional vehicles are basic type of transportation means manually driven by users to reach destinations through ground traveling. However, recent development of autonomous driving technologies and resulting development of various types of mobility vehicles have provided a new concept of quick and efficient transportation over long distances by use of various mobility vehicles, instead of simply using respective mobility vehicles to destinations.

A mobility vehicle refers to a ground mobility vehicle traveling on the ground, an air mobility vehicle flying in the air, a water mobility vehicle navigating in water, or the like. Conventional mobility vehicles are based on different concepts such that, when passengers need to change mobility vehicles, a separate terminal or the like is necessary for the transfer.

However, recent technological development has set a trend towards integration of various mobility vehicles. In other words, according to a new concept, passengers do not need to change mobility vehicles, but the mobility vehicle moves to the transfer base, and the transportation means occupied by passengers is changed to another while the passengers remain.

Therefore, there is a demand for development of a complex mobility vehicle hub, wherein passengers can easily use air, ground, and water mobility vehicles, passengers can change respective mobility vehicles in a quick and convenient manner, and respective mobility vehicles may be managed by a single integrated hub.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a mobility vehicle hub including a water layer configured on a water surface such that water mobility vehicles can move in/out, a ground layer connected to the ground above the water layer such that ground mobility vehicles can move in/out, and a port layer configured above the ground layer and provided with a take-off/landing pad for air mobility vehicles, configured as a complex mobility vehicle transfer base for ground/water/air mobility vehicles, and facilitating air, ground, and water mobility vehicles to move upwards/downwards between respective layers through an internal space and to convert to different kinds of mobility vehicles such that passengers can change mobility vehicles conveniently and rapidly.

In accordance with an aspect, the present invention may provide a mobility vehicle hub configured to function as a terminal for an air mobility vehicle, a ground mobility vehicle, or a water mobility vehicle, the mobility vehicle hub including a plurality of layers through a combination of: a water layer configured to be connected to a surface of water and having an entrance for a water mobility vehicle; a port layer having a take-off and landing pad for an air mobility vehicle; or a ground layer configured to be connected to a ground and having an entrance for a ground mobility vehicle, wherein an elevation passage is provided between each of the water, port and ground layers, the elevation passage has an internal space extending in an up-down direction of the mobility vehicle hub, the internal space is connected to each of the water, port and ground layers, and the air mobility vehicle, the ground mobility vehicle, or the water mobility vehicle is lifted or lowered through the internal space.

The air mobility vehicle may include a cabin room in which passengers ride and a flight module provided on a top portion of the cabin room and configured to fly in the air, and the cabin room and the flight module may be detachably coupled to each other.

The ground mobility vehicle may include a cabin room in which passengers ride and a traveling module provided on a bottom portion of the cabin room and configured to travel on the ground, and the cabin room and the traveling module are detachably coupled to each other.

The water mobility vehicle may include a cabin room in which passengers ride and a navigation module provided on a bottom portion of the cabin room and configured to navigate on water, and the cabin room and the navigation module are detachably coupled to each other.

An elevation portion may be provided in the internal space of the elevation passage and coupled to the air mobility vehicle, the ground mobility vehicle, or the water mobility vehicle, and when the air mobility vehicle, the ground mobility vehicle, or the water mobility vehicle is coupled to the elevation portion, the elevation portion may lift or lower the air mobility vehicle, the ground mobility vehicle, or the water mobility vehicle in the elevation passage.

The air mobility vehicle, the ground mobility vehicle, or the water mobility vehicle, lifted or lowered through the elevation passage, may be changed to an air mobility vehicle, a ground mobility vehicle, or a water mobility vehicle depending on a use of each layer which the air mobility vehicle, the ground mobility vehicle, or the water mobility vehicle reaches through upward or downward movement.

A plurality of take-off and landing pads of the port layer, a plurality of entrances of the ground layer, or a plurality of entrances of the water layer may be provided at spaced points on respective water, port and ground layers The water layer may be provided on water, and may provide, to passengers, an activity space extending into water from a bottom portion of the water layer.

An extension portion may be provided on an external wall of the water layer and opened upward to form a portion of the ground layer, and the extension portion may be connected to the ground.

A magnetic force portion including a spring, a permanent magnet, and an electromagnet may be provided at an end portion of the extension portion, and the magnetic force portion may be configured to lock the extension portion to the ground by magnetic force thereof.

The mobility vehicle hub may include a first hub and a second hub. A first extension portion provided on a water layer of the first hub and a second extension portion provided on a water layer of the second hub may be opened toward each other to be connected to each other, connecting a ground layer of the first hub to a ground layer of the second hub.

A magnetic force portion including a spring, a permanent magnet, and an electromagnet may be provided at an end portion of each of the first extension portion and the second extension portion, and the first extension portion and the second extension portion may be locked to each other through the magnetic force portions when being brought into contact with each other.

A propulsion portion may be provided on the bottom portion of the water layer, and the propulsion portion may propel the mobility vehicle hub in water so that the mobility vehicle hub is moved.

The propulsion portion may include at least one screw, and the at least one screw may rotate to propel the mobility vehicle hub in a plurality of directions.

The mobility vehicle hub may further include a control server configured to monitor a traffic volume of mobility vehicles in each of the water, port and ground layers, and the control server may control the propulsion portion so that a position of the mobility vehicle hub is moved according to the traffic volume of mobility vehicles.

A mobility vehicle hub according to various exemplary embodiments of the present invention includes a water layer configured on a water surface such that water mobility vehicles can move in/out, a ground layer connected to the ground above the water layer such that ground mobility vehicles can move in/out, and a port layer configured above the ground layer and provided with a take-off/landing pad for air mobility vehicles, configured as a complex mobility vehicle transfer base for ground/water/air mobility vehicles. This is advantageous in that air, ground, and water mobility vehicles can move upwards/downwards between respective layers through an internal space and can convert to different kinds of mobility vehicles such that passengers can change mobility vehicles conveniently and rapidly.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
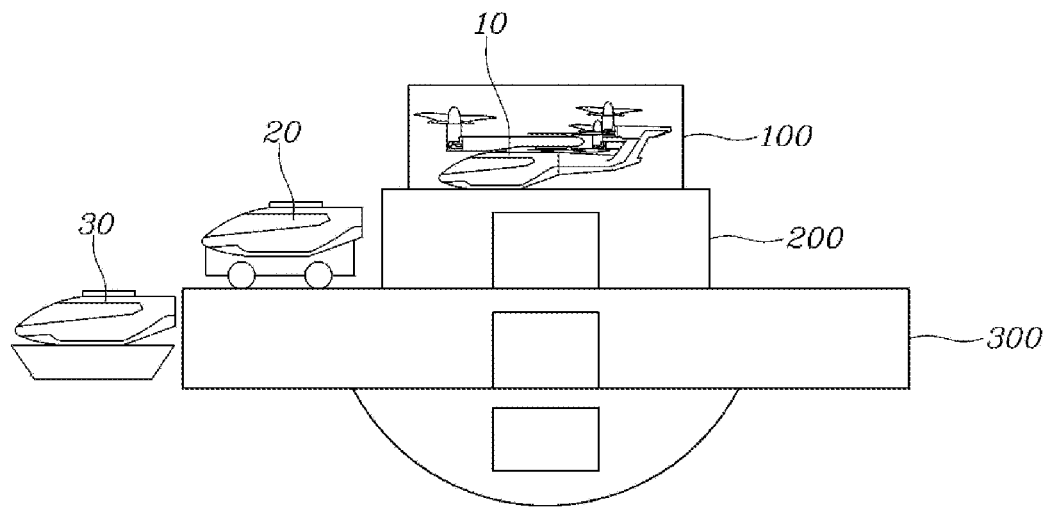
FIG. 1 schematically illustrates a mobility vehicle hub according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 2:
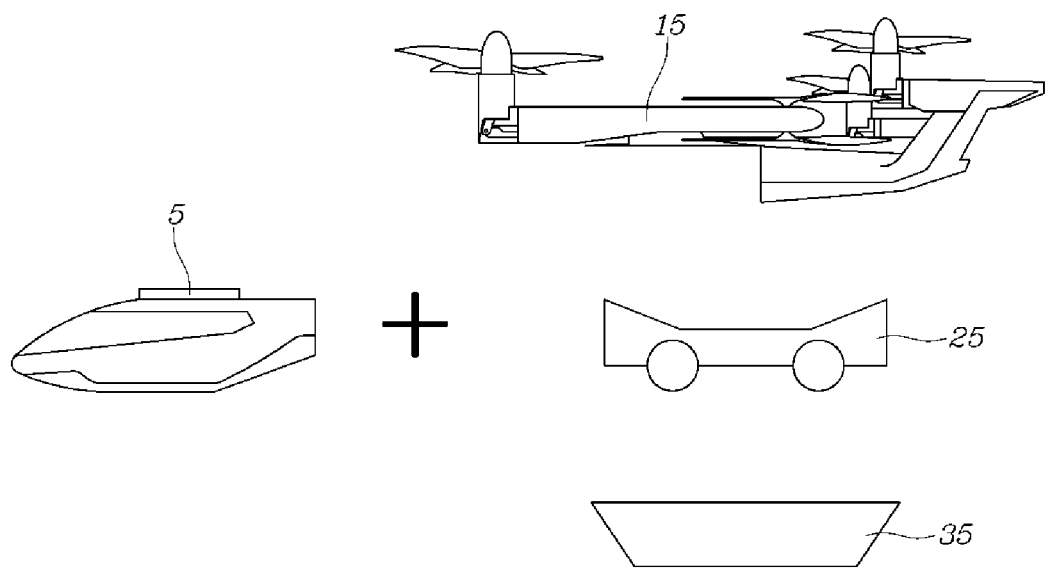
FIG. 2 illustrates that an air mobility vehicle, a ground mobility vehicle, and a water mobility vehicle are made in a mobility vehicle hub according to various exemplary embodiments of the present invention.
Figure 3:
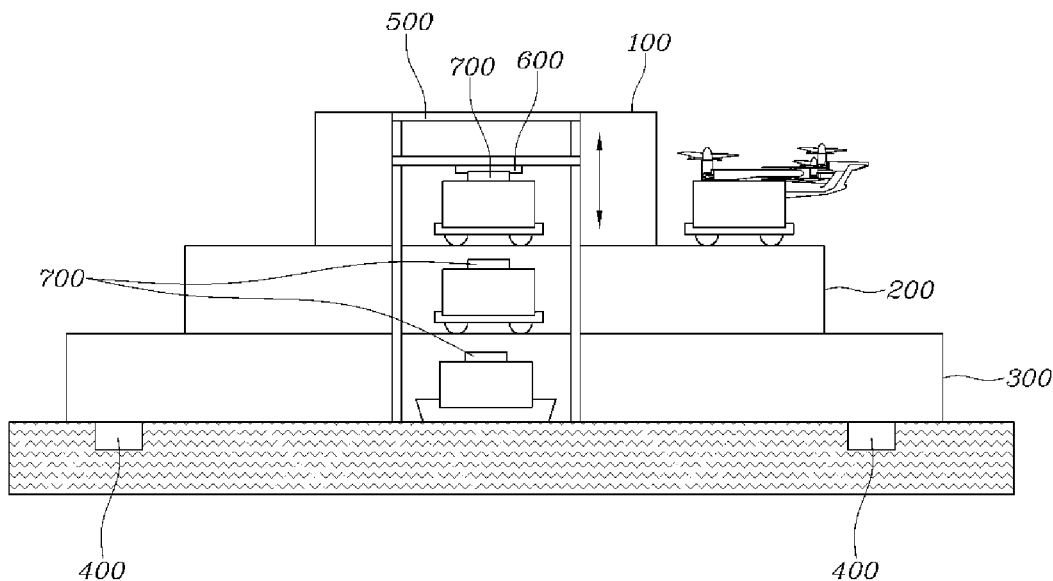
FIG. 3 is a side view showing the internal space of a mobility vehicle hub according to various exemplary embodiments of the present invention.
Figure 4:
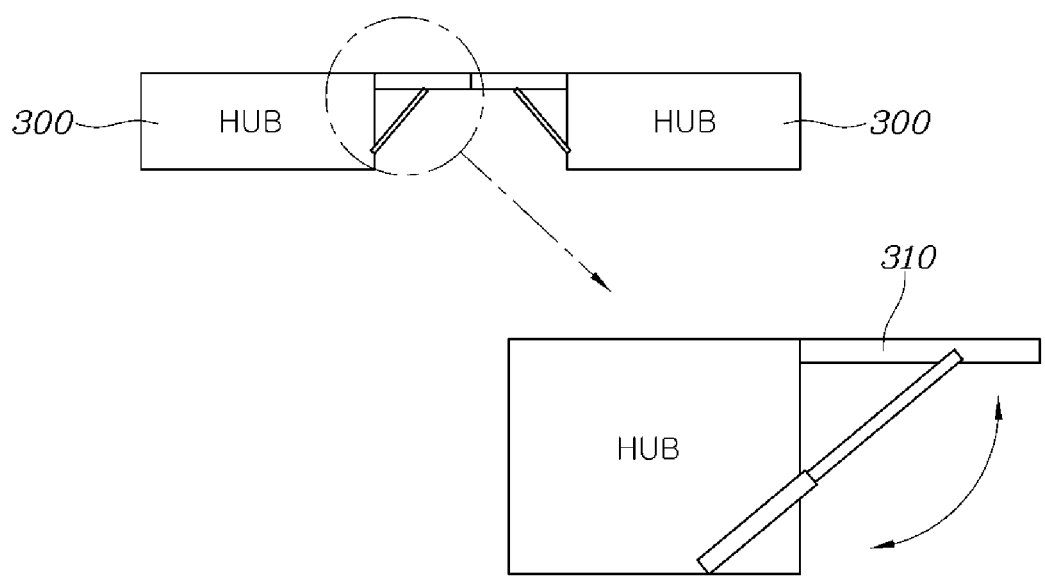
FIG. 4 illustrates a structure in which extension portions are connected to each other in a mobility vehicle hub according to various exemplary embodiments of the present invention.
Figure 5:
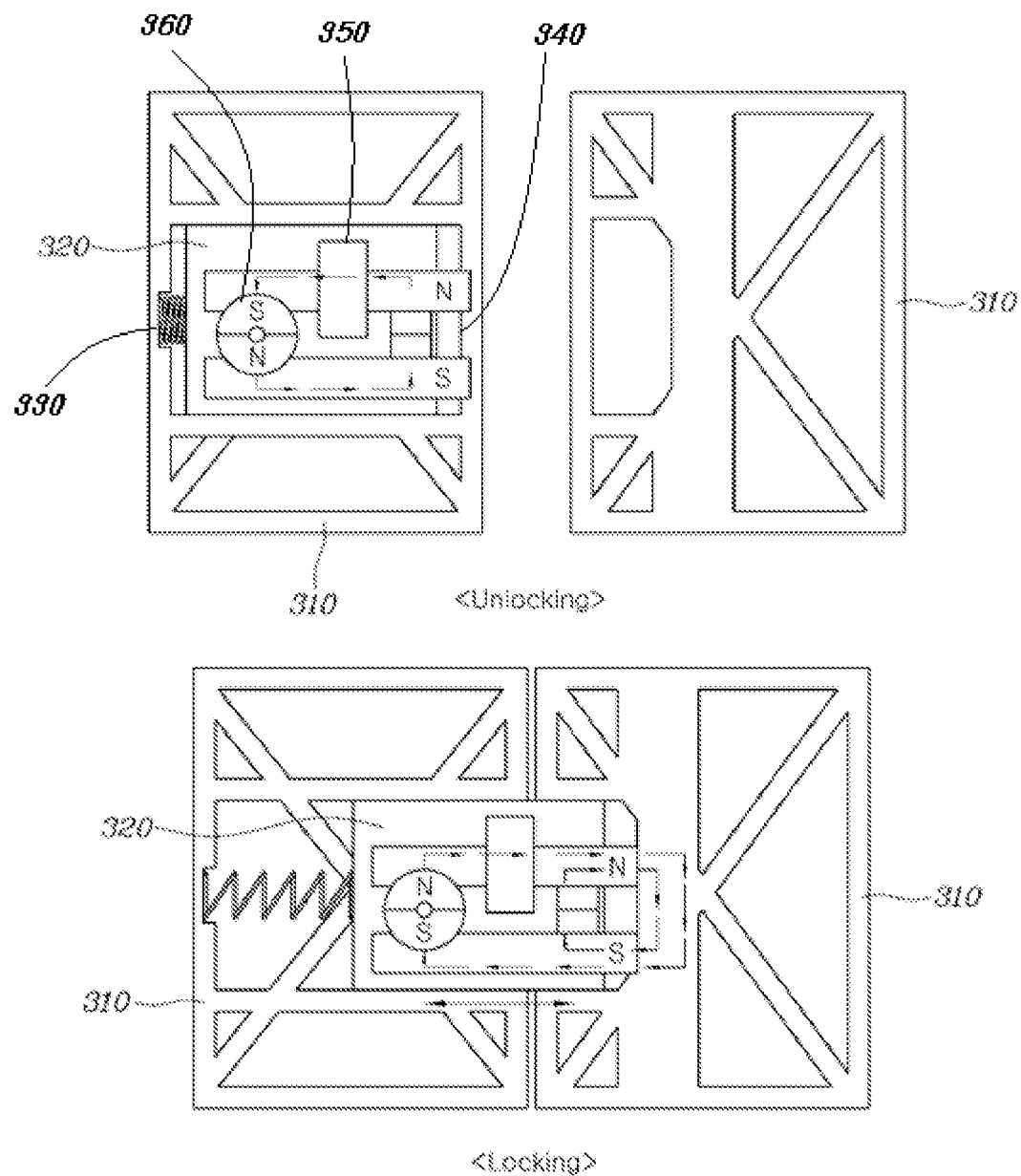
FIG. 5 illustrates a magnetic force portion provided on an extension portion in a mobility vehicle hub according to various exemplary embodiments of the present invention.
Figure 6:
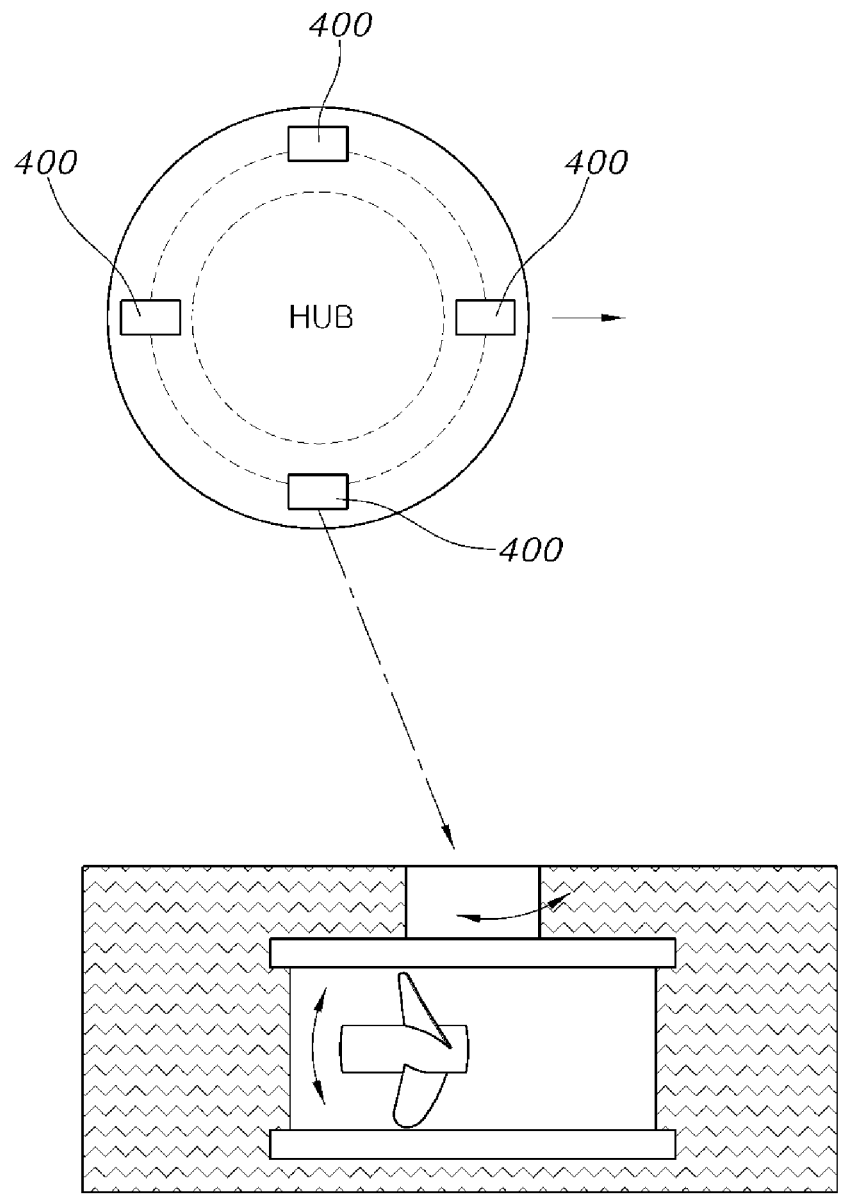
FIG. 6 illustrates a propulsion portion provided on the bottom portion of a water layer in a mobility vehicle hub according to various exemplary embodiments of the present invention.

FIG. 1 schematically illustrates a mobility vehicle hub according to various exemplary embodiments of the present invention. FIG. 2 illustrates that an air mobility vehicle, a ground mobility vehicle, and a water mobility vehicle are made in a mobility vehicle hub according to various exemplary embodiments of the present invention. FIG. 3 is a side view showing the internal space of a mobility vehicle hub according to various exemplary embodiments of the present invention. FIG. 4 illustrates a structure in which extension portions are connected to each other in a mobility vehicle hub according to various exemplary embodiments of the present invention. FIG. 5 illustrates a magnetic force portion provided on an extension portion in a mobility vehicle hub according to various exemplary embodiments of the present invention. FIG. 6 illustrates a propulsion portion provided on the bottom portion of a water layer in a mobility vehicle hub according to various exemplary embodiments of the present invention.

FIG. 1 schematically illustrates a mobility vehicle hub according to various exemplary embodiments of the present invention. FIG. 2 illustrates that an air mobility vehicle, a ground mobility vehicle, and a water mobility vehicle are made in a mobility vehicle hub according to various exemplary embodiments of the present invention. The mobility vehicle hub according to various exemplary embodiments of the present invention is a mobility vehicle hub configured as a terminal for an air mobility vehicle, a ground mobility vehicle, or a water mobility vehicle, and may include a plurality of layers through a combination of: a water layer 300 connected to the surface of water and having an entrance for a water mobility vehicle 30; a port layer 100 having a take-off and landing pad for an air mobility vehicle 10; or a ground layer 200 connected to the ground and having an entrance for a ground mobility vehicle 20. An elevation passage 500 is provided between the layers, the elevation passage 500 has an internal space extending in the upward/downward direction, the internal space is connected to each of the water, port and ground layers, and the air mobility vehicle 10, the ground mobility vehicle 20, or the water mobility vehicle 30 may be lifted or lowered through the internal space.

For example, the mobility vehicle hub according to various exemplary embodiments of the present invention may be arranged in a form in which the ground layer 200 or the port layer 100 is coupled with reference to the water layer 300 or in a form in which the water layer 300, the ground layer 200, and the port layer 100 are all coupled to each other.

Furthermore, referring to FIG. 1 and FIG. 2, the air mobility vehicle 10 of the mobility vehicle hub according to various exemplary embodiments of the present invention may include: a cabin room 5 in which passengers ride; and a flight module 15 provided on the top portion of the cabin room 5 and configured to fly in the air, wherein the cabin room 5 and the flight module 15 are detachably coupled to each other.

The ground mobility vehicle 20 of the mobility vehicle hub according to various exemplary embodiments of the present invention may include: a cabin room 5 in which passengers ride; and a traveling module 25 provided on the bottom portion of the cabin room 5 and configured to travel on the ground, wherein the cabin room 5 and the traveling module 25 are detachably coupled to each other.

Furthermore, the water mobility vehicle 30 of the mobility vehicle hub according to various exemplary embodiments of the present invention may include: a cabin room 5 in which passengers ride; and a navigation module 35 provided on the bottom portion of the cabin room 5 and configured to navigate on water, wherein the cabin room 5 and the navigation module 35 are detachably coupled to each other.

That is, the mobility vehicle hub according to various exemplary embodiments of the present invention functions as a complex mobility base covering land, sea, and air. The mobility vehicle hub is placed on water, and is thus free from space limitations of a building, etc. Passengers can easily board an air mobility vehicle, a ground mobility vehicle, or a water mobility vehicle, which the passengers desire to board, in the mobility vehicle hub.

Furthermore, the mobility vehicles can move up and down through the port layer, the ground layer, and the water layer, respectively, and the cabin rooms 5 in which passengers ride may be separated from the flight module 15, the traveling module 25, and the navigation module 35. Thus, the passengers can more conveniently use the mobility vehicles because only the modules are replaced while the passengers are on board in the cabin rooms 5 without directly moving and transferring.

FIG. 3 is a side view showing the internal space of a mobility vehicle hub according to various exemplary embodiments of the present invention. In the mobility vehicle hub according to various exemplary embodiments of the present invention, an elevation portion 600, which is to be coupled to the air mobility vehicle 10, the ground mobility vehicle 20, or the water mobility vehicle 30, is provided in the internal space of the elevation passage 500. When the air mobility vehicle 10, the ground mobility vehicle 20, or the water mobility vehicle 30 is coupled to the elevation portion 600, the elevation portion 600 may lift or lower the air mobility vehicle 10, the ground mobility vehicle 20, or the water mobility vehicle 30 in the elevation passage 500.

The elevation passage 500 of the mobility vehicle hub according to various exemplary embodiments of the present invention may be formed to vertically extend through the centers of the port layer 100, the ground layer 200, and the water layer 300. The air mobility vehicle 10, the ground mobility vehicle 20, or the water mobility vehicle 30 is lifted or lowered between the layers through the elevation passage 500 so that passengers can transfer to another type of mobility vehicle from an existing mobility vehicle which the passengers are on board.

In the mobility vehicle hub according to various exemplary embodiments of the present invention, the elevation portion 600, which is lifted or lowered along the elevation passage 500 while being coupled to the air mobility vehicle 10, the ground mobility vehicle 20, or the water mobility vehicle 30, is provided in the internal space of the elevation passage 500. A coupling portion 700 is provided on the top portion of the cabin room 5 of each mobility vehicle. Therefore, the cabin room 5 may be lifted or lowered while being coupled to the elevation portion 600 through the coupling portion 700.

Furthermore, in the mobility vehicle hub according to various exemplary embodiments of the present invention, the air mobility vehicle 10, the ground mobility vehicle 20, or the water mobility vehicle 30, lifted or lowered through the elevation passage 500, may be changed to the air mobility vehicle 10, the ground mobility vehicle 20, or the water mobility vehicle 30 depending on a use of each layer which the air mobility vehicle 10, the ground mobility vehicle 20, or the water mobility vehicle 30 reaches through the upward or downward movement.

The cabin room 5 may fly in the air by being coupled to the flight module 15 through the coupling portion 700. When the cabin room 5 is lifted or lowered while being coupled to the elevation portion 600, the cabin room 5 is separated from the traveling module 25 or the navigation module 35, and then coupled to a traveling module 25 or a navigation module 35 separately provided in a layer to which the cabin room is moved. Therefore, the module is replaced while passengers are on board in the cabin room 5, and thus mobility vehicle transferring may be easily performed.

In other words, a complex mobility vehicle transfer base may be implemented by the mobility vehicle hub according to various exemplary embodiments of the present invention, and a passenger may rapidly and comfortably reach a desired destination by use of an efficient path and an efficient movement means while minimizing trouble.

In the mobility vehicle hub according to various exemplary embodiments of the present invention, a plurality of take-off and landing pads of the port layer, a plurality of entrances of the ground layer, or a plurality of entrances of the water layer may be provided at spaced points on respective water, port and ground layers Furthermore, in the mobility vehicle hub according to various exemplary embodiments of the present invention, the water layer 300 may be provided on water, and may provide, to passengers, an activity space extending into water from the bottom portion of the water layer.

In the mobility vehicle hub according to various exemplary embodiments of the present invention, the layers may be formed in circular shapes, and may be formed to have areas that gradually decrease from the water layer 300 to the port layer 100 via the ground layer 200. In each of the water, port and ground layers, for example, four entrances, one for each of the cardinal points, may be formed. Furthermore, referring to FIG. 1, the activity space extending into water from the bottom portion of the water layer 300 may be formed as a circular space protruding downwardly from the bottom portion of the water layer 300. The activity space may be provided as a space for rest or the like to passengers who want to take a rest or do other activities.

FIG. 4 illustrates a structure in which extension portions are connected to each other in a mobility vehicle hub according to various exemplary embodiments of the present invention. FIG. 5 illustrates a magnetic force portion provided on an extension portion in a mobility vehicle hub according to various exemplary embodiments of the present invention. In the mobility vehicle hub according to various exemplary embodiments of the present invention, an extension portion 310 is provided on the external wall of the water layer 300, and is opened upward to form a portion of the ground layer 200. The extension portion 310 may be connected to the ground.

In an exemplary embodiment of the present invention, the extension portion 310 is pivotally coupled to the water layer 300 and rotatable by a telescopic cylinder. In an exemplary embodiment of the present invention, the telescopic cylinder is electrically connected to the controller to control the position of the extension portion 310.

In the mobility vehicle hub according to various exemplary embodiments of the present invention, a magnetic force portion 320 including a spring, a permanent magnet, and an electromagnet may be provided at the end portion of the extension portion 310, and the magnetic force portion 320 may lock the extension portion 310 to the ground by magnetic force thereof. The magnetic force portion 320 is a magnetic module, and as the magnetic pole of the electromagnet changes depending on a voltage, is strongly fixed to an armature by the magnetic force of the magnetic force portion 320. For stronger fixed force, a plurality of magnetic force portions 320 may be provided at the end portion of the extension portion 310.

Furthermore, the lower end portion of the extension portion 310 may be supported and opened upwards from the external wall of the water layer 300 through a hydraulic system. The extension portion 310 may be moved upwards to a plane identical to that of the ground layer 200 to extend the ground layer 200, configured as a bridge through which the ground mobility vehicle 20 can reach from the ground layer 200 to the ground.

The mobility vehicle hub according to various exemplary embodiments of the present invention may include a first hub and a second hub. A first extension portion provided on a water layer 300 of the first hub and a second extension portion provided on a water layer 300 of the second hub may be opened toward each other to be connected to each other, connecting a ground layer 200 of the first hub to a ground layer 200 of the second hub.

Furthermore, in the mobility vehicle hub according to various exemplary embodiments of the present invention, a magnetic force portion 320 including a spring 330, a permanent magnet 340, and an electromagnet 350 is provided at the end portion of each of the first extension portion and the second extension portion.

In an exemplary embodiment of the present invention, a rotary permanent magnet 360 is mounted between the permanent magnet 340, and the electromagnet 350 and configured to selectively rotation according to the direction of magnetic flux of the electromagnet 350.

The first extension portion and the second extension portion may be locked to each other through the magnetic force portions 320 when being brought into contact with each other.

That is, the mobility vehicle hub according to various exemplary embodiments of the present invention may be extended, as desired, by integrating a plurality of mobility vehicle hubs through extension portions 310. In other words, a plurality of mobility vehicle hubs according to various exemplary embodiments of the present invention may be disposed at desired points based on passenger demand. The hubs may form one integrated hub by connecting ground layers 200 thereof through extension portions 310, and the number of hubs to be connected to each other may flexibly increase or decrease based on a change in the rate of hub use.

The mobility vehicle hub according to various exemplary embodiments of the present invention may be disposed in a circular shape, and may have four entrances north, south, east, and west. In the instant case, a plurality of hubs may extend in a grid pattern by connecting the respective ground layers 200 thereof to each other through the extension portions 310.

In an exemplary embodiment of the present invention, the electromagnet 350 is electrically connected to a controller to control the direction of the magnetic flux of the electromagnet 350.

FIG. 6 illustrates a propulsion portion provided on the bottom portion of a water layer in a mobility vehicle hub according to various exemplary embodiments of the present invention. In the mobility vehicle hub according to various exemplary embodiments of the present invention, propulsion portions 400 may be provided on the bottom portion of the water layer 300. The propulsion portions 400 may propel the mobility vehicle hub in water so that the mobility vehicle hub is moved.

Furthermore, in the mobility vehicle hub according to various exemplary embodiments of the present invention, each of the propulsion portions 400 may include at least one screw, and the at least one screw may rotate to propel the mobility vehicle hub in a plurality of directions.

That is, the mobility vehicle hub according to various exemplary embodiments of the present invention is disposed on water in a river, a lake, or a sea, and thus, unlike a building, may move on water. Therefore, the hub may be directly moved to a desired point by the propulsion portions 400 and disposed at the desired point, and a place in which the hub is disposed may also be easily and conveniently changed. Accordingly, the mobility vehicle hub may be moved on water by a plurality of propulsion portions 400, and a plurality of hubs may also be moved to places adjacent to each other such that the plurality of hubs may be coupled to each other through the extension portions 310.

The mobility vehicle hub according to various exemplary embodiments of the present invention may further include a control server configured to monitor the traffic volume of a mobility vehicle in each of the water, port and ground layers, wherein the control server controls the propulsion portions 400 such that the position of the mobility vehicle hub is moved according to the traffic volume of the mobility vehicle.

The control server may monitor the positions or movement paths of the air mobility vehicle 10, the ground mobility vehicle 20, and the water mobility vehicle 30. The control server may: collect traffic volume of mobility vehicles between mobility vehicle hubs, such as the present states of the air mobility vehicle 10, the ground mobility vehicle 20, and the water mobility vehicle 30 in each of the mobility vehicle hubs placed in respective regions; determine, based on the collected traffic volume, whether there is overload of a mobility vehicle in each hub; when a hub is overloaded, supplement the overloaded hub by propelling another neighboring hub to the place in which the overloaded hub is positioned.

Information related to hub movement may be transmitted to passengers, who are in the air mobility vehicle 10, the ground mobility vehicle 20, and the water mobility vehicle 30, placed in the hub to be propelled, and the hub may be moved with consent from the passengers. A passenger who does not give consent may be induced to get off or transfer.

The mobility vehicle hub according to various exemplary embodiments of the present invention functions as a complex mobility vehicle terminal while floating on water such as a river or a sea through the water layer 300 placed on water. Usually, a river in a city passes through the center portion of the city, and thus passengers can conveniently move to the center portion of the city through the mobility vehicle hub of the present invention. When many mobility vehicles are on a road and in the sky, traffic congestion occurs and causes standby time. Thus, if passengers transfer to various mobility vehicles by use of a hub placed on the sea, an air space over the sea may be additionally used, and thus the standby time may be minimized.

Furthermore, the water layer 300 floating on water may be easily provided compared with a hub fixed on the ground. A response may be made to mobility demand by moving a hub to another position based on the state of traffic volume. Expandability through connection between hubs may be ensured. In the rush hour, a space besides a wide river (e.g., a terrace land on the river) may be additionally used as a parking space or a transfer space.

In the case of a hub placed on a building or at the center portion of a city, complaints about noise caused by increasing of mobility vehicles are made. However, if a hub is placed on the sea, a relatively small number of complaints about noise may be made. A water (sea) region is not a personal land, and thus the compensation cost is low. Furthermore, when an emergency situation occurs in an air mobility vehicle or the like, it is possible to relatively easily cope with the emergency situation (an emergency landing using the sea) compared with a building or a place with a large floating population.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

In addition, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

In an exemplary embodiment of the present invention, each operation described above may be performed by a control device, and the control device may be configured by multiple control devices, or an integrated single control device.

In an exemplary embodiment of the present invention, the control device may be implemented in a form of hardware or software, or may be implemented in a combination of hardware and software.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A mobility vehicle hub configured to function as a terminal for an air mobility vehicle, a ground mobility vehicle, or a water mobility vehicle, the mobility vehicle hub having a plurality of layers comprising:
    a water layer configured to be connected to a surface of water and having an entrance for the water mobility vehicle;

a port layer having a take-off and landing pad for the air mobility vehicle; or a ground layer configured to be connected to a ground and having an entrance for the ground mobility vehicle, wherein an elevation passage is provided between each of the water, port and ground layers, the elevation passage has an internal space extending in an up-down direction of the mobility vehicle hub, the internal space is connected to each of the water, port and ground layers, and wherein the air mobility vehicle, the ground mobility vehicle, or the water mobility vehicle is lifted or lowered through the internal space.

2. The mobility vehicle hub of claim 1,
wherein the air mobility vehicle includes:
a cabin room in which passengers ride; and
a flight module provided on a top portion of the cabin room and configured to fly in the air, and
wherein the cabin room and the flight module are detachably coupled to each other.

3. The mobility vehicle hub of claim 1, wherein the ground mobility vehicle includes:
a cabin room in which passengers ride; and
a traveling module provided on a bottom portion of the cabin room and configured to travel on the ground,
wherein the cabin room and the traveling module are detachably coupled to each other.

4. The mobility vehicle hub of claim 1, wherein the water mobility vehicle includes:
a cabin room in which passengers ride; and
a navigation module provided on a bottom portion of the cabin room and configured to navigate on water,
wherein the cabin room and the navigation module are detachably coupled to each other.

5. The mobility vehicle hub of claim 1,
wherein an elevation portion is provided in the internal space of the elevation passage and is configured to be coupled to the air mobility vehicle, the ground mobility vehicle, or the water mobility vehicle, and when the air mobility vehicle, the ground mobility vehicle, or the water mobility vehicle is coupled to the elevation portion, the elevation portion lifts or lowers the air mobility vehicle, the ground mobility vehicle, or the water mobility vehicle in the elevation passage to a predetermined location.

6. The mobility vehicle hub of claim 1, wherein the air mobility vehicle, the ground mobility vehicle, or the water mobility vehicle, lifted or lowered through the elevation passage, is changed to an air mobility vehicle, a ground mobility vehicle, or a water mobility vehicle depending on a use of each layer which the air mobility vehicle, the ground mobility vehicle, or the water mobility vehicle reaches through upward or downward movement in the elevation passage.

7. The mobility vehicle hub of claim 1, wherein a plurality of take-off and landing pads of the port layer, a plurality of entrances of the ground layer, or a plurality of entrances of the water layer are provided at spaced points on respective water, port and ground layers.

8. The mobility vehicle hub of claim 1, wherein the water layer is provided on water, and provides, to passengers, an activity space extending into water from a bottom portion of the water layer.

9. The mobility vehicle hub of claim 1, wherein an extension portion is provided on an external wall of the water layer and is movable to form a portion of the ground layer, so that the extension portion is connected to the ground.

10. The mobility vehicle hub of claim 9, further including a magnetic force portion provided at an end portion of the extension portion, wherein the magnetic force portion is configured to lock the extension portion to the ground by magnetic force thereof.

11. The mobility vehicle hub of claim 10, wherein the magnetic force portion includes:
an elastic member elastically supporting an end of the magnetic force portion; and
a permanent magnet and an electromagnet magnetically engaged to the permanent magnet selectively.

12. The mobility vehicle hub of claim 11, wherein the magnetic force portion further includes a rotary permanent magnet rotatably mounted between the electromagnet and the permanent magnet and selectively rotatable according to change of direction of magnetic flux in the electromagnet.

13. The mobility vehicle hub of claim 9, including:
a first hub and a second hub, wherein a first extension portion provided on a water layer of the first hub and a second extension portion provided on a water layer of the second hub are opened toward each other to be connected to each other, thereby connecting a ground layer of the first hub to a ground layer of the second hub.

14. The mobility vehicle hub of claim 13, wherein each of the first extension portion and the second extension portion includes a magnetic force portion including:
an elastic member elastically supporting an end of the magnetic force portion; and
a permanent magnet and an electromagnet magnetically engaged to the permanent magnet selectively,
wherein the first extension portion and the second extension portion are locked to each other through each magnetic force portion when being brought into contact with each other.

15. The mobility vehicle hub of claim 14, wherein each magnetic force portion further includes a rotary permanent magnet rotatably mounted between the electromagnet and the permanent magnet and selectively rotatable according to change of direction of magnetic flux in the electromagnet.

16. The mobility vehicle hub of claim 1, wherein a propulsion portion is provided on a bottom portion of the water layer, and the propulsion portion is configured to propel the mobility vehicle hub in water so that the mobility vehicle hub is moved.

17. The mobility vehicle hub of claim 16, wherein the propulsion portion includes at least one screw, and the at least one screw is configured to rotate to propel the mobility vehicle hub in a plurality of directions.

18. The mobility vehicle hub of claim 16, further including a control server configured to monitor a traffic volume of mobility vehicles in each of the water, port and ground layers in each mobility vehicle hub, wherein the control server is configured to control the propulsion portion so that a position of the mobility vehicle hub is moved according to the traffic volume of mobility vehicles in each mobility vehicle hub.

19. The mobility vehicle hub of claim 1,
wherein each of the water, port and ground layers is formed in a shape of a circle,
wherein a propulsion portion is provided on a bottom portion of the water layer, and the propulsion portion is configured to propel the mobility vehicle hub in water so that the mobility vehicle hub is moved, and wherein the propulsion portion includes a plurality of screws mounted along a circumference direction of the water layer, and the plurality of screws is configured to rotate to propel the mobility vehicle hub in a plurality of directions.

\* \* \* \* \*